United States Patent
Hall

(10) Patent No.: US 9,969,891 B2
(45) Date of Patent: May 15, 2018

(54) COATING COMPOSITION FOR THE PROTECTION OF COMPLEX METAL STRUCTURES AND COMPONENTS

(71) Applicant: OXIFREE GLOBAL LIMITED, Frimley, Surrey (GB)

(72) Inventor: Edward Hall, Spring, TX (US)

(73) Assignee: OXIFREE GLOBAL LIMITED, Frimley, Surrey (GB)

( * ) Notice: Subject to any disclaimer, the term of this patent is extended or adjusted under 35 U.S.C. 154(b) by 0 days. days.

(21) Appl. No.: 15/601,651

(22) Filed: May 22, 2017

(65) Prior Publication Data

US 2017/0275475 A1 Sep. 28, 2017

Related U.S. Application Data

(60) Continuation-in-part of application No. 15/040,445, filed on Feb. 10, 2016, now Pat. No. 9,657,180, which is a division of application No. 14/268,551, filed on May 2, 2014, now Pat. No. 9,267,040.

(60) Provisional application No. 61/821,844, filed on May 10, 2013.

(51) Int. Cl.
| | |
|---|---|
| *C09D 5/16* | (2006.01) |
| *B05D 1/02* | (2006.01) |
| *C09D 5/08* | (2006.01) |
| *B05D 3/02* | (2006.01) |
| *C09D 101/12* | (2006.01) |
| *C08K 3/04* | (2006.01) |
| *C08K 3/22* | (2006.01) |

(52) U.S. Cl.
CPC ............. *C09D 5/1656* (2013.01); *B05D 1/02* (2013.01); *B05D 3/0254* (2013.01); *C09D 5/08* (2013.01); *C09D 5/082* (2013.01); *C09D 101/12* (2013.01); *C08K 3/04* (2013.01); *C08K 2003/2241* (2013.01)

(58) Field of Classification Search
CPC .......... B05D 1/02; B05D 3/0254; C09D 5/08; C09D 5/082; C09D 5/1656; C09D 101/12; C08K 5/0016; C08K 5/101; C08K 3/04; C08K 2003/2241; C08L 91/00

See application file for complete search history.

(56) References Cited

U.S. PATENT DOCUMENTS

| | | | | |
|---|---|---|---|---|
| 8,772,390 B1 * | 7/2014 | Fink | ..................... | C09D 101/14 524/318 |
| 9,267,040 B2 * | 2/2016 | Fink | ........................ | C09D 5/082 |
| 9,657,180 B2 * | 5/2017 | Fink | ..................... | C09D 5/1656 |

* cited by examiner

*Primary Examiner* — Anthony J Green
(74) *Attorney, Agent, or Firm* — Egbert Law Offices, PLLC

(57) ABSTRACT

A coating composition for application to a component or structure has cellulose acetate, a plasticizer with an antioxidant, a corrosion inhibitor with an antioxidant, a vegetable oil, and a stabilizer. The plasticizer is linseed oil. The corrosion inhibitor is canola oil. The vegetable oil is epoxidized soybean oil. The stabilizer is titanium dioxide. These components are intimately mixed together so as to form a solid mixture. The solid mixture is converted into a solid state and applied to the component or structure. The liquid state is then dried on the component or structure for a period of time.

19 Claims, 3 Drawing Sheets

COATING COMPOSITION FOR THE PROTECTION OF COMPLEX METAL STRUCTURES AND COMPONENTS

RELATED U.S. APPLICATIONS

The present application is a continuation-in-part of U.S. patent application Ser. No. 15/040,445, filed on Feb. 10, 2016, and entitled "Coating Composition for the Protection of Complex Metal Structures and Components Used in Submerged Environments", issued as U.S. Pat. No. 9,657,180 on May 23, 2017. U.S. patent application Ser. No. 15/040,445 was a divisional application of U.S. patent application Ser. No. 14/268,551, filed on May 2, 2014, and entitled "Coating Composition and Method for the Protection of Complex Metal Structures and Components Used in Submerged Environments", which issued as U.S. Pat. No. 9,267,040 on Feb. 23, 2016. U.S. patent application Ser. No. 14/268,551 claimed priority from U.S. Provisional Patent Application Ser. No. 61/821,844, filed on May 10, 2013, and entitled "Coating System for the Protection of Complex Metal Structures in Submerged Environments".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the coating of metal structures. More particularly, the present invention relates to corrosion-proof coatings that can be sprayed upon substrates and metal structures. Additionally, the present invention relates coating system for application to structures and components that are to be installed or used in a subsea environment.

2. Description of Related Art Including Information Disclosed Under 37 CFR 1.97 and 37 CFR 1.98

Metallic structures that are used in subsea structures often become the victim of the effects of oxidization. This oxidization can cause the structures to degrade and, in some cases, completely lose structural integrity.

The factors that can cause the degradation of metallic structures can include galvanic corrosion, environmental corrosion and chemical corrosion. FIG. 1 shows an illustration of the seven factors that can create corrosion. FIG. 2 illustrates the effects of oxidization at the interface between the water droplet, carbon steel and air. Ultimately, the oxidization will begin the reduction of the metal surface. An electron flow from the anode to the cathode actually occurs, as shown in FIG. 2. The metal or metals of a subsea structure can serve as anode, cathode, and the necessary metallic conductor between the anode and the cathode. The water, in particular, the salt water in the subsea environment, provides the strong electrolyte that is required to complete the circuit of the cell. Such cells develop their driving force or electrical potential from differing conditions at the interface between metal and the electrolyte of the anode and cathode. These differences fall into three categories: (1) dissimilar metals comprising the anode and cathode; (2) inhomogeneity of a single metal which causes one area to be anodic to another area; and (3) inhomogeneity of the electrolyte.

In the past various processes have been used for protecting such metal structures. Galvanizing, powder coating, painting or other chemical or physical adaptation of the metals can occur during the production process. Corrosion control can also take place "in the field" as to prolong the life of metallic structures. The methods for corrosion protection tend to fail after a short period of time when the product is installed.

Generally, in order to eliminate corrosion, the basic rule of thumb is that is necessary to remove one element in the corrosion triangle in order to prevent corrosion. Generally, the application of coatings is utilized so as to achieve the removal of an element from the corrosion triangle. Unfortunately, coatings and paint have many disadvantages. Typically, coatings and paint will tend to degrade after only six months because of the porous nature of the coatings. It is also very labor intensive to remove or repair when in service. A great deal of time is required for conventional protective coatings since coatings need to be applied, cured, and dried. Many times, this time period can be in excess of eight hours. During this time period, moisture or other contaminants, have a chance to set and degrade the integrity of the coatings before they have dried. Many coatings contain harmful hydrocarbons and solvents, which can have an adverse ecological impact. Spreadable coatings generally create approximately 40% non-recoverable waste at the point of application. Everyday damage to the paint or epoxy coating tends to create a failure to the integrity of the entire coating. As such, complete removal and re-application would be required. The removal of protective paint or epoxy coatings can actually be damaging to the surfaces they are intended to protect. Often, solid coatings will need to be removed by using solvents and abrasive tools or machinery. This can be damaging, costly, and can create hazardous waste. Generally, most protective coatings will need to be combined with other products in order to offer proper protection, especially for complex structures or where connections/joints are used. Complex structural shapes, such as bolted flanges, or operable components, such as valves, have many different surface area crevices. These can provide a breeding ground for corrosion since moisture can build up and pool for a long periods of time. Generally, painting and coatings will not work because the paint cannot cover or the seal crevices.

In certain circumstances, products other than paint and coatings are utilized to provide such protection. In particular, petroleum-impregnated tape can be used to wrap around bolts and connections. This petroleum-impregnated tape is not ecologically or environmentally safe, nor will it create an airtight seal around the structure. As such, it is necessary to rely upon active corrosion inhibitors in order to battle the effects of corrosion. Corrosion will occur naturally because of the porous nature of the tape.

The corrosion protection of subsea structures is currently in its infancy. The metallic structures used in the subsea environment are often the victim of oxidization. This can cause such subsea structures to degrade and possibly lose structural integrity. Currently available methods for offering anti-corrosion protection often use a solvent-based compound which solidifies and is not removable. As such, it cannot be used on serviceable or operable components in submerged environments. Additionally, these materials are often not suitable for use in the very high pressures and cold temperatures in the subsea environment. As such, they have not been used in subsea application. In many cases, one of the biggest expenses associated with subsea equipment is the maintenance and preservation of such equipment. As such, a need has developed so as to provide a protective coating system that is particularly applicable for use in subsea structures.

In the past, various patents and patent applications have been issued relating to protective coatings. For example, an early patent was U.S. Pat. No. 2,180,427 issued on Nov. 21, 1939 to Moncrieff et al., for corrosion prevention. This is a liquid composition that contains a nitrogen base which normally has a corrosive action on ions and an alkaline earth metal compound which is convertible by aqueous carbon dioxide into water-insoluble carbonate. When the compound is present in sufficient amounts it can materially inhibit the corrosive action of the nitrogenous base on iron.

U.S. Pat. No. 2,426,379, issued on Aug. 20, 1947 to Swain at al., provides a coating composition containing cellulose acetate. This coating composition is an aqueous emulsion of about 10 parts of a melamine-formaldehyde resin prepared by reacting one mol of melamine with six mols of formalin and reacting the condensation product thereof with butanol. The composition has about 90 parts of cellulose acetate and about 100 parts at a fatty oil-modified phthalic glyceride resin.

U.S. Pat. No. 2,599,384, issued on Jun. 3, 1952 to Gross at al., teaches a solid stick corrosion inhibitor and a process for preventing corrosion of oil and gas well equipment. This composition has a corrosion-preventing inhibitor, a weighting material and three non-related amorphous solids.

U.S. Pat. No. 2,843,503 issued on Jul. 15, 1958 to Salo at al., provides a corrosion-resistant coating that comprises 5 to 40% methylol phenyl allyl ether, 60 to 95% cellulose acetate butyrate, a solid basis and a solvent mixture consisting of toluene xylene, butyl alcohol, isopropyl alcohol and butyl acetate.

U.S. Pat. No. 2,892,725, issued on Jun. 30, 1959 to A. J. Rosenthal, describes a corrosion inhibitor. This corrosion inhibitor is obtained by extruding a 15 to 27% solution of cellulose triacetate in a volatile solvent containing at least 80% of methylene chloride and water. An acetylenic alcohol is incorporated into the solution.

U.S. Pat. No. 2,927,031, issued on Mar. 1, 1960 to A. J. Rosenthal, describes another type of corrosion inhibitor having a solution consisting of a halogen-containing organic solvent of a lower alkanoic acid ester of cellulose and a stabilizing proportion of a member selected from the group consisting of hydroxy lower alkyl amimine nitrate and a cadmium salt of a water-insoluble fatty acid.

U.S. Pat. No. 3,220,866, issued on Nov. 30, 1965 to A. J. Rosenthal, describes a corrosion inhibitor having a solution and a halogen-containing organic solvent of a lower alkanoic acid ester of cellulose in a small amount sufficient to substantially inhibit the corrosion of metals of an organo-tin carboxylate. The carboxylate is non-corrosive to metals and does not have a particular affinity for the cellulose ester.

U.S. Pat. No. 3,505,244 issued on Apr. 7, 1970 to J. C. Cessna, discloses an encapsulated corrosion inhibitor in the form of a free-flowing dry powder of rupturable capsules having a particle size in the range of about 0.1 to 2,000 microns in diameter and having an inner core of a corrosion inhibitor for heat exchange liquid encapsulated within a rupturable outer sheath of a film former. The corrosion inhibitor is present in the capsules in an amount not exceeding about 99% by weight.

U.S. Pat. No. 3,839,051, issued on Oct. 1, 1974 to L. Cerveny, provides a removable or stripable anti-corrosive coating composition. This composition comprises of cellulose acetobutyrate, plasticizers therefor, a corrosion inhibitor in the form of at least one adduct of chromic acid with carbonic acid imine diamide and organic solvent. The composition is made by dissolving the corrosion inhibitor in organic solvent, adding the plasticizer to the solution and then bringing the solution into contact with cellulose acetobutyrate while agitating to form a homogeneous composition.

U.S. Pat. No. 5,081,174, issued on Jan. 14, 1992 to E. J. VanBuskirk, teaches a protective coating composition for use on metals. This coating composition is a combination of a base-neutralized acid-functional copolymer and a wax lubricant. The removability of the coating is enhanced through the use of phosphoric acid as an additive to the coating composition.

U.S. Patent Publication No. 2002/0119252, published on Aug. 29, 2002 to A. Haycox, describes a substance and method for creating a sheath-like protective coating. The substance is brought from a solid state into a liquid state. In the liquid state, it can be sprayed onto a surface. After spraying, it will return the a solid state so as to form a coherent body, free of perforations and of a high degree of toughness. The sheath-like protective coating can be pulled off the surface as a whole or at least in large sections. The substance is of such a nature that it can be repeatedly liquefied by the application of heat and solidified by the removal of heat.

U.S. Patent Publication No. 2008/0171212, published on Jul. 17, 2008 to Shedlosky et al., discloses a protective coating for metals. This protective coating has a crosslinked polyester that is removable with a basic composition.

It is an object of the present invention to provide a coating system that effectively protects the component, structure or piece of equipment from the symptoms of corrosion.

It is another object of the present invention to provide a coating system that avoids the use of petroleum-based chemicals.

It is another object of the present invention to provide a coating system that can be easily removed from the component or structure.

It is a further object of the present invention to provide a coating system that has no harmful side effects to living organisms.

It is a further object of the present invention to provide a coating system which is reusable.

It is another object of the present invention to provide a coating system that remains flexible and supple under the high pressures and cold temperatures of the subsea environment.

It is a further object of the present invention to provide a coating system which is not degradable.

It is a further object of the present invention to provide a coating system that is non-porous.

It is still a further object of the present invention to provide a coating system that is adaptable to a variety of complex structures and components.

It is another object of the present invention to provide a coating system that can be easily applied by spraying onto the subsea component or structure.

These and other objects and advantages of the present invention will become apparent from a reading of the attached specification and appended claims.

BRIEF SUMMARY OF THE INVENTION

The present invention is a coating composition for application to a component or structure. The coating composition comprises a cellulose acetate, a plasticizer, a corrosion inhibitor, a vegetable oil, and a stabilizer. The cellulose acetate, the plasticizer, the corrosion inhibitor, the vegetable oil, and the stabilizer are mixed together.

In the present invention, the vegetable oil is epoxidized. The plasticizer is a linseed oil having an antioxidant. The corrosion inhibitor is a canola oil having an antioxidant. The vegetable oil is an epoxidized soybean oil. The stabilizer is titanium dioxide.

In particular, the cellulose acetate is between 39% and 45% by weight of the total composition. The plasticizer is between 22% and 25% by weight of the total composition. The corrosion inhibitor is between 22% and 25% by weight of the total composition. The vegetable oil is 7% by weight of the total composition. The stabilizer is 3.4% by weight of the total composition. Carbon black can be mixed with the cellulose acetate, the plasticizer, the corrosion inhibitor, the vegetable oil and the stabilizer. The carbon black would be 0.6% by weight of the total composition. In particular, the linseed oil, as the plasticizer, is 22% to 25% by weight of the total composition. The canola oil, which is the corrosion inhibitor, is between 22% and 25% by weight of the total composition. The epoxidized soybean oil, which is the vegetable oil, is 7% by weight of the total composition. The titanium dioxide, which is the stabilizer, is 3.4% of the total composition.

The present invention is also a method of applying a coating to a component or structure. The method includes the steps of: (1) mixing a cellulose acetate, a plasticizer, a corrosion inhibitor, a vegetable oil and a stabilizer together to form a solid mixture; (2) heating the solid mixture so as to convert the solid mixture into a liquid state; (3) covering the component or structure with the liquid state; and (4) drying the liquid state on the component or structure for a period of time. The step of heating includes heating the solid mixture to a temperature of 160° C. Specifically, the solid mixture is heated to a temperature of between 160° C. and 170° C. The step of covering include spraying the liquid state of the mixture onto the component or structure. The step of covering include spraying only a single coating of the liquid state of the mixture onto the component or structure. The step of drying includes drying the liquid state for a period of time of less than five minutes.

In this method, the cellulose acetate is between 39% and 45% by weight of the total composition. The plasticizer is between 22% and 25% by weight of the total composition. The corrosion inhibitor is between 22% to 25% by weight of the total composition. The vegetable oil is 7% by weight of the total composition. The stabilizer is 3.4% by weight of the total composition. In particular, the plasticizer is linseed oil with an antioxidant. The corrosion inhibitor is canola oil with an antioxidant. The vegetable oil is epoxidized soybean oil. The stabilizer is titanium dioxide.

The method of the present invention, carbon black can be mixed with the cellulose acetate, the plasticizer, the corrosion inhibitor, the vegetable oil and the stabilizer. This carbon black would be 0.6% by weight of the total composition.

The present invention is especially applicable to the protection of bolts, joints, junctions, and other operable metallic components. The present invention provides a reliable and sustainable solution utilizing organic ingredients (i.e. vegetable oil). This means that the product is recyclable.

The composition of the present invention, when applied to subsea components or structures, can withstand high pressures. This composition has been tested successfully to 3500 p.s.i. The composition can be easily applied to the subsea structure top side before going subsea. The product hardens very rapidly around the item. The composition of the present invention remains extremely flexible, even at extremely low temperatures. The composition of the present invention can be removed from the substrate. Although it is removable, it will not permit ingress. The composition can also be reusable. Ultimately, the composition is ecologically safe.

If the composition of the present invention is damaged subsea, the damage can be easily repaired by bringing the structure top side. The damaged material can be removed. The composition can then be reapplied over the damaged area. The composition of the present invention will adhere itself since the material is applied in a molten state.

The composition of the present invention, in a normal state (i.e. ambient conditions below 120° C.) is a solid product. As such, it requires heat in order to melt the composition down to a liquid state. Once the liquid state is in contact with the component or structure, the composition will adapt to the shape of the component or structure and very rapidly dry so as to form a protective flexible cocoon. Within the cocoon, the active corrosion inhibiting agents which create a membrane layer between the component and the protective coating. This membrane will eradicate any further surface corrosion, as well as ensuring that no foreign contaminates ingress under the encapsulation. When the composition of the present invention is utilized on bolted structures, the inhibiting oils will penetrate the thread of the nut and bolt. This ensures that the bolt does not seize internally to the structure and the encapsulation.

The coating of the present invention creates adhesion through encapsulation. As such, the coating can be removed from the substrate in small portions or removed as a whole with a knife in a short period of time. Importantly, there is no surface adhesion between the composition and the substrate. As such, the composition can be applied to a moving part, such as a valve of a blowout preventor. On bolted structures, the interface between the edge of the coating and the steel can further be reinforced since the composition can work in complement with other flexible sealing compounds which can provide an additional barrier against extreme pressures at the leading edge of the material.

The composition of the present invention allows it to be pliable so that the material can expand and contract along the component or structure. Most other corrosion control products do not have a great deal of elasticity or flexibility. This can cause them to perish and crack, especially when subjected to large temperature variations and high external pressures.

The foregoing Section is intended to describe, in generality, the preferred embodiment of the present invention. It is understood that modifications to this preferred embodiment can be made within the scope of the present invention. As such, this Section should not to be construed, in any way, as limiting of the scope of the present invention. The present invention should only be limited by the following claims and their legal equivalents.

DETAILED DESCRIPTION OF THE INVENTION

Figure 1:
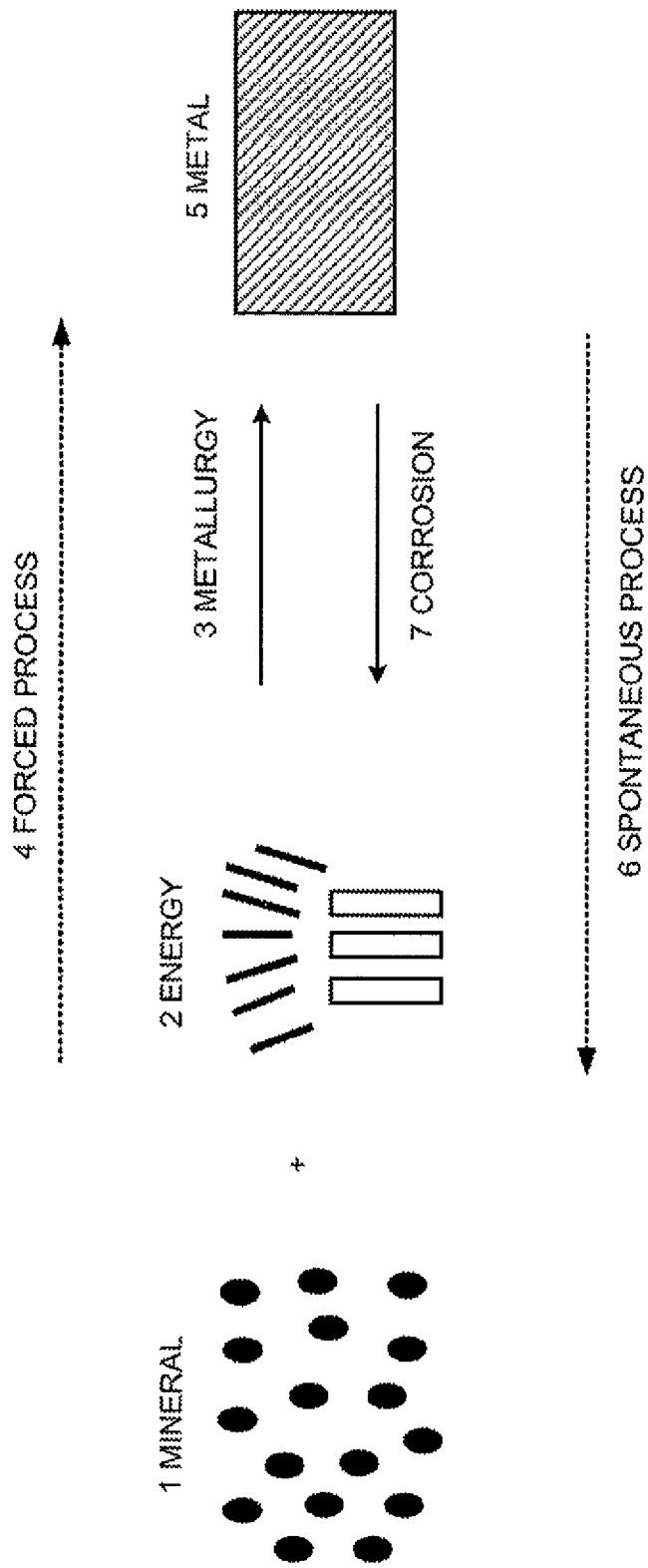
FIG. 1 is a diagram showing the various factors that create corrosion.
Figure 2:
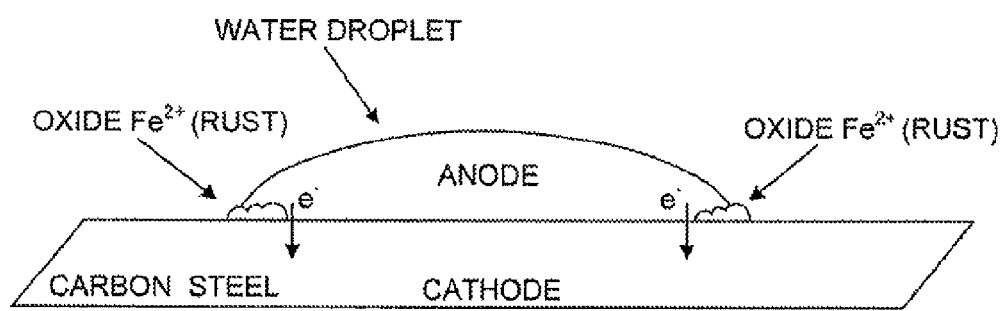
FIG. 2 is an illustration of the interface between the water droplet, the substrate and air.

The polymeric coating of the present invention has a variety components. In particular, the components of the coating of the present invention can include cellulose acetate, a plasticizer, a corrosion inhibitor, a vegetable oil, and a stabilizer. The cellulose acetate, the plasticizer, the corrosion inhibitor, the vegetable oil, and the stabilizer are intimately mixed together. The plasticizer is a linseed oil having an antioxidant. The corrosion inhibitor is canola oil having an antioxidant. The vegetable oil is epoxidized soybean oil. The stabilizer is titanium dioxide. Carbon black can be mixed with the cellulose acetate, the plasticizer, the corrosion inhibitor, the vegetable oil and the stabilizer.

Experiments were conducted with mixtures of the present invention. The following mixture was found to have great temperature stability and strength. This particular formulation is made up of 39% by weight of cellulose acetate, 25% by weight of linseed oil with an antioxidant, 25% by weight of canola oil with an antioxidant, 7% epoxidized soybean oil, 3.4% titanium dioxide, and 0.6% carbon black.

This formulation was further altered so as to provide a superior quality product. This alternative formulation is comprised of 45% by weight of cellulose acetate, 22% by weight of linseed oil with an antioxidant, 22% by weight of a canola oil with an antioxidant, 7% by weight of epoxidized soybean oil, 3.4% by weight of titanium dioxide, in 0.6% by weight of carbon black. This formulation was found to be particularly applicable to both submerged structures and surface structures. Compositions ranging between the component ratios expressed in each of the above formulations was felt to be also significantly applicable to components or structures, whether submerged or surface-located.

This composition provides a unique sprayable coating system that can be applied to address a wide range of subsea corrosion issues. The composition is particularly applicable to the protection of bolted or jointed junction/connections, or other operable metallic components. The present invention overcomes the shortcomings of existing corrosion control techniques in order to provide a reliable and sustainable solution. The composition is a standalone product. It does not have to be used with other products in order to get the proper result.

The composition of the present invention provides a significant longevity of protection. It is believed that the composition can provide protection for over thirty years. The composition is easily and quickly applied, dries very rapidly, is removable and reusable, and is also ecologically safe. Damage to this composition can be repaired in the field very easily at the point of damage. All that is necessary is to remove the damaged material and reapply the composition to the damaged area. The composition will adhere to itself since the material is applied in a molten state. This composition, once applied, can be removed with a knife by hand. As such, potential damage to the subsea structure is avoided. There is no need for expensive ancillary equipment. As such, the present composition provides a very time-efficient process. Importantly, when applied to a subsea structure, the composition becomes flexible, impact resistant and corrosion resistant. The flexibility facilitates the ability of the composition to better adhere to and to distribute forces to the structure. The subsea pressure can also serve to seal the composition against the subsea structure. The composition further avoids bubble formation when placed under the subsea pressure.

Figure 3:
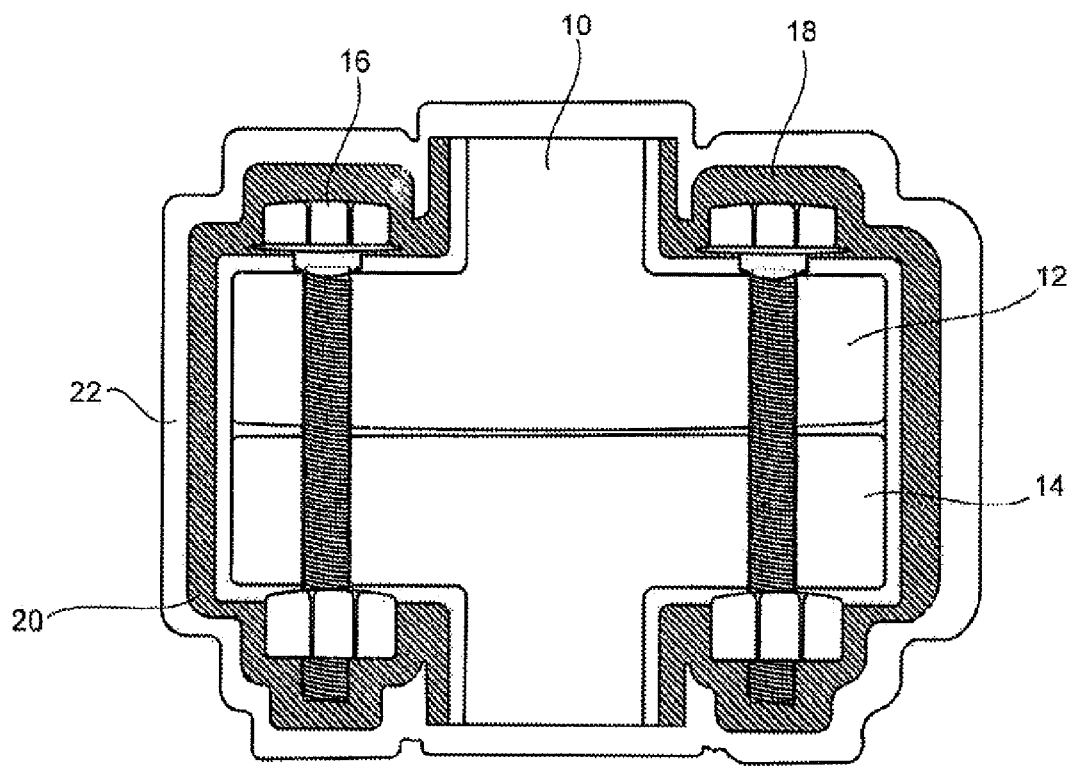
FIG. 3 shows the application of the composition of the present invention onto a subsea structure.

The composition of the present invention is a solid product at ambient conditions below 160° C. As such, heat is required to melt the solid product to a liquid state. Once in a liquid state, the composition of the present invention can be applied to metallic surfaces. Once the liquid composition of the present invention makes contact with the surface, this composition will take a form of the shape of the surface and dry very rapidly so as to provide a protective cocoon. Within this cocoon, there are active corrosion-inhibiting agents which create a membrane layer between the substrate and the protective coating. FIG. 3 shows the application of the protective coating. This membrane layer eradicates any further surface corrosion as well as ensures that foreign contaminates cannot ingress under the encapsulation. When the composition is used on bolted structures, such as that shown in FIG. 3, the inhibiting oils penetrate the thread of the nut and the bolt to ensure that the bolt does not seize internally to the structure and the encapsulation.

With reference to FIG. 3, the coating has been applied to a flanged connection 10. The flanged connection includes an upper flange member 12, a lower flange connection 14, and bolts 16 and 18. The bolts 16 and 18 are threadedly secured with the flanges 12 and 14 so as to secure the flanges together. The corrosion inhibitor is formed as inner layer 20. The inner layer 20 acts immediately and actively when in contact with the surfaces of the flange connection 10. The polymeric resin 22 is on the outside of the corrosion inhibitor and acts as passive protection. The polymeric resin 22 encapsulates the flange connection 10 and avoids ingress of suspended particles, water, air, etc.

The flexible coating only creates adhesion through encapsulation. As such, the coating can be removed from the component or structure in small portions or removed as a whole with a knife in an matter of seconds. Another advantage to the composition of the present invention is that there is no surface tension. As such, the composition can be applied to a moving part, such as a valve. The economic advantages of the present invention are obvious when compared to other solvent-based products, such as paints or epoxies. The composition of the present invention only requires minimal surface preparation prior to application. This surface preparation can include the removal of loose material, grease, oil build-up, and moisture. The composition of the present invention does not create any waste during the application process. The application-to-dry time is 1/20 the cure time for most paint coatings. Only one coating of the composition of the present invention is necessary. The coating composition of the present invention has a drying time of less than five minutes. As such, the present invention is able to provide protection very quickly. There is no need to apply a primer, as in the case of a paint coating. Ultimately, with paint coatings, several coatings of paint are required in order to provide the necessary protection. This can take in excess of two hours to cure. The composition of the present invention can be removed entirely from a substrate and then can be melted down and reused up to six times. The composition of the present invention continue to be reused while retaining its complete anti-corrosion properties. The composition of the present invention does not have a hazzard classification for transport or disposal. As such, the present invention avoids any expensive disposal cost.

Due to the active nature of the composition of the present invention, along with its ability to retain flexibility, the material can expand and contract along with the component or structure that it is protecting. Many other corrosion control products do not have sufficient elasticity or flexibility. As such, this can cause the prior art compositions to perish and crack, especially when subjected to large temperature variations.

The foregoing disclosure and description of the invention is illustrative and explanatory thereof. Various changes in the described composition or the steps in the described method can be made which the scope of the present claims without departing from the true spirit of the invention. The present invention should only be limited by the following claims and their legal equivalents.

I claim:

1. A coating composition for application to a component or structure, the coating composition comprising:
    a cellulose acetate;
    a linseed oil having an antioxidant;
    a corrosion inhibitor;
    a vegetable oil; and
    a stabilizer, in which the cellulose acetate, the linseed oil, the corrosion inhibitor, the vegetable oil, and the stabilizer are mixed together.

2. The coating composition of claim 1, said vegetable oil being epoxidized.

3. The coating composition of claim 1, said corrosion inhibitor being canola oil having a antioxidant.

4. The coating composition of claim 1, said vegetable oil being epoxidized soybean oil.

5. The coating composition of claim 1, said stabilizer being titanium dioxide.

6. The coating composition of claim 1, said cellulose acetate being between 39% and 45% by weight of the total composition, said linseed oil being between 22% and 25% by weight of the total composition, said corrosion inhibitor being between 22% and 25% by weight of the total composition, said vegetable oil being 7% by weight of the total composition, said stabilizer being 3.4% by weight of the total composition.

7. The coating composition of claim 6, further comprising:
    carbon black mixed with cellulose acetate, said linseed oil, said corrosion inhibitor, said vegetable oil and said stabilizer.

8. The coating composition of claim 7, said carbon black being 0.6% by weight of the total composition.

9. The coating composition of claim 1, said cellulose acetate being between 39% and 45% by weight of the total composition, said linseed oil of between 22% and 25% by weight of the total composition, said corrosion inhibitor being canola oil of between 22% and 25% by weight of the total composition, said vegetable oil being epoxidized soybean oil in an amount of 7% by weight of the total composition, said stabilizer being titanium dioxide in an amount of 3.4% of the total composition.

10. A method of applying a coating to a component or a structure, the method comprising:
    mixing cellulose acetate, a linseed oil having an antioxidant, a corrosion inhibitor, a vegetable oil, and a stabilizer together so as to form a solid mixture;
    heating the solid mixture so as to convert the solid mixture into a liquid state;
    covering the component or the structure with the liquid state; and
    drying the liquid state on the component or structure for a period of time.

11. The method of claim 10, the step of heating comprising:
    heating the solid mixture to a temperature of greater than 160 C.

12. The method of claim 10, the step of heating comprising:
    heating the solid mixture to a temperature of between 160 C and 170 C.

13. The method of claim 10, the step of covering comprising:
    spraying the liquid state of the mixture onto the component or the structure.

14. The method of claim 13, the step of covering comprising:
    spraying only a single coating of the liquid state of the mixture onto the component or the structure.

15. The method of claim 10, the step of drying comprising:
    drying the liquid state for a period of time of less than 5 minutes.

16. The method of claim 10, said cellulose acetate being between 39% and 45% by weight of the total mixture, said linseed oil being between 22% and 25% by weight of the total mixture, the corrosion inhibitor being between 22% and 25% by weight of the total mixture, said vegetable oil being 7% by weight of the total mixture, said stabilizer being 3.4% by weight of the total mixture.

17. The method of claim 10, said corrosion inhibitor being canola oil having an antioxidant, said vegetable oil being an epoxidized soybean oil, said stabilizer being titanium dioxide.

18. The method of claim 10, said cellulose acetate being between 39% and 45% by weight of the total mixture, said linseed oil being between 22% and 25% by weight of the total mixture, said corrosion inhibitor being canola oil of between 22% and 25% by weight of the total mixture, said corrosion inhibitor being epoxidized soybean oil that is 7% by weight of the total mixture, said stabilizer being titanium dioxide that is 3.4% by weight of the total mixture.

19. The method of claim 10, further comprising:
    mixing carbon black with said cellulose acetate, said linseed oil, said corrosion inhibitor, said vegetable oil and said stabilizer, said carbon black being 0.6% by weight of the total mixture.

* * * * *